(12) United States Patent
Inoue

(10) Patent No.: US 6,682,610 B1
(45) Date of Patent: Jan. 27, 2004

(54) MANUFACTURING METHOD FOR HOLLOW STABILIZER

(75) Inventor: Kanji Inoue, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 09/501,650

(22) Filed: Feb. 10, 2000

(30) Foreign Application Priority Data

Feb. 15, 1999 (JP) ............................................. 11-036003

(51) Int. Cl.[7] ................................................. C21D 9/08
(52) U.S. Cl. ....................... 148/519; 148/590; 148/593; 72/53; 72/283
(58) Field of Search ................................. 148/519, 590, 148/591, 593; 72/53, 283

(56) References Cited

U.S. PATENT DOCUMENTS

| | | | |
|---|---|---|---|
| 3,812,702 A | * 5/1974 | Benteler et al. | ............... 72/283 |
| 4,070,209 A | 1/1978 | Usui | |
| 4,138,141 A | 2/1979 | Andersen | |
| 4,231,555 A | 11/1980 | Saito | |
| 4,372,576 A | 2/1983 | Inoue | |
| 4,378,122 A | 3/1983 | Ohno et al. | |
| 4,526,628 A | 7/1985 | Ohno et al. | |
| 5,192,376 A | * 3/1993 | Tanabe et al. | ............... 148/520 |
| 5,370,751 A | * 12/1994 | von Hagen et al. | ......... 148/330 |
| 5,491,996 A | 2/1996 | Baarman et al. | |
| 5,598,735 A | 2/1997 | Saito et al. | |

FOREIGN PATENT DOCUMENTS

| | | | |
|---|---|---|---|
| DE | 2931340 A | * | 2/1981 |
| DE | 42 21 957 C1 | | 1/1994 |
| EP | 0 092 815 A2 | | 11/1983 |
| EP | 0 842 716 A2 | | 5/1998 |
| GB | 2 069 945 A | | 9/1981 |
| JP | 57-004319 A | * | 1/1982 |
| JP | 58-141329 A | * | 8/1983 |
| JP | 58-188518 A | * | 11/1983 |
| JP | 61-064817 A | * | 4/1986 |
| JP | 3-236452 | | 10/1991 |
| JP | 06-220535 A | * | 8/1994 |
| RU | 2022710 | | 11/1994 |
| SU | 727287 | | 4/1980 |
| SU | 1442310 | | 12/1988 |
| SU | 1770014 | | 10/1992 |

OTHER PUBLICATIONS

"The Making, Shaping and Treating of Steel", 10the ed., Herbick and Held, 1985, pp 1017–1032, 1050–1059.*
"Metals Handbook Ninth Edition, vol. 14: Forming and Forging", ASM International, 1988, pp 334–335.*
Patent Abstracts of Japan, vol. 009, No. 319 (M–439), Dec. 14, 1985 and JP 60–154827 A (Toyota Jidosha KK), Aug. 14, 1985—Abstract only.
Koppers, U: "Flexibles Walzen Von Ringen Mit Profilquerschnitt-Anwendungen" Umformtechnik, Vol 27, No. 1, pp. 35–38, (1993).

* cited by examiner

*Primary Examiner*—George Wyszomierski
*Assistant Examiner*—Janell Combs Morillo
(74) *Attorney, Agent, or Firm*—Frishauf, Holtz, Goodman & Chick, P.C.

(57) ABSTRACT

A manufacturing method for a hollow stabilizer comprises a primary pipe manufacturing process for subjecting a seam-welded pipe to hot reduction working, thereby obtaining a primary pipe, and winding the primary pipe in a coil, a cold drawing process for subjecting the primary pipe to cold drawing so that the rate of reduction in area is not lower than 30%, thereby obtaining a thick-walled pipe having a wall thickness ratio of 0.20 to 0.27 higher than that of the seam-welded pipe and tensile strength of 800 N/mm$^2$ to 1,000 N/mm$^2$ is obtained, an internal shot peening process to be carried out as required, a bending process for bending the thick-walled pipe into a desired stabilizer shape in a cold state, an annealing process for subjecting the pipe to stress relieving annealing at a temperature of 300° C. to 450° C., after the bending process, and a shot peening process for shot-peening the annealed pipe.

2 Claims, 3 Drawing Sheets

MANUFACTURING METHOD FOR HOLLOW STABILIZER

CROSS-REFERENCE TO RELATED APPLICATION

This application is based upon and claims the benefit of priority from the prior Japanese Patent Application No. 11-036003, filed Feb. 15, 1999, the entire contents of which are incorporated herein by reference.

BACKGROUND OF THE INVENTION

The present invention relates to a manufacturing method for a hollow stabilizer used in a vehicle such as an automobile.

Conventionally, a stabilizer is used as means for enhancing the roll stiffness of a vehicle. A hollow stabilizer using a pipe is known as a version that has developed in order to reduce the vehicle weight. FIG. 6 shows manufacturing processes for a conventional hollow stabilizer. In general, a seam-welded steel pipe of low carbon steel (carbon content: 0.2 to 0.3%) is used for the conventional hollow stabilizer. After the seam-welded pipe is formed into a desired stabilizer shape in a cold state, it is heated and subjected to heat treatment such as quenching and tempering for thermally refined, and is further shot-peened.

The seam-welded pipe is manufactured in a manner such that a hot-rolled and hooped sheet is formed into a pipe with a circular cross section by the conven- tional roll forming method as seams along its axial direction are welded. Accordingly, the wavelength thickness ratio (wall thickness/outside diameter) of pipes that can be manufactured by the roll forming method cannot be adjusted to a very high value. Thus, it is hard for normal equipment to manufacture seam-welded pipes with high wall thickness ratios exceeding 0.15–0.17.

Heretofore, therefore, a hollow stabilizer that is based on a seam-welded pipe must inevitably use a thin-walled pipe with a relatively low wall thickness ratio. In view of lightness in weight, the thin-walled pipe is a material superior to a conventional stabilizer that is formed of a solid material (solid steel rod). The lower the wall thickness ratio (or the thinner the wall of the pipe), the higher the design stress of the stabilizer is, and therefore, the more the stress is restricted. The design stress is a reference stress that is based on a regular stabilizer shape and a fixed spring constant. Thus, a seam-welded pipe can be used if there is room for stress in designing the stabilizer. The use of the seam-welded pipe, compared to the solid stabilizer, can achieve a reduction of 50% or more in weight.

In the case of some high-stress hollow stabilizers, however, the design criterion cannot be cleared even with use of seam-welded pipes with the highest available wall thickness ratio of 0.15 to 0.17 (rate of weight reduction: 40% to 35%). In this case, solid rods should be employed inevitably. Despite the advantage of their lightness in weight, therefore, the hollow stabilizers presently account for a share of only scores of percent in the field of stabilizer production.

BRIEF SUMMARY OF THE INVENTION

Accordingly, the object of the present invention is to provide a manufacturing method for a hollow stabilizer, whereby the aforementioned drawbacks attributable to the use of seam-welded pipes for stabilizers can be eliminated, and a plan for putting hollow stabilizers to practical use can be expedited.

In order to achieve the above object, a manufacturing method according to the present invention comprises a primary pipe manufacturing process for subjecting a seam-welded pipe to continuous hot reduction working, thereby obtaining a primary pipe, and winding the primary pipe in a coil, a cold drawing process for subjecting the primary pipe to cold drawing so that the rate of reduction in area is not lower than 30%, thereby obtaining a thick-walled pipe having a wall thickness ratio of 0.20 to 0.27 higher than that of the seam-welded pipe and tensile strength of 800 N/mm² to 1,000 N/mm² is obtained, and a bending process for bending the thick-walled pipe, obtained in the cold drawing process, into a desired stabilizer shape in a cold state.

According to the invention, the drawbacks of the conventional hollow stabilizers that are formed of seam-welded pipes can be eliminated even with use of a seam-welded pipe, and the manufactured stabilizer can be made lighter enough in weight than the conventional solid stabilizers. The hollow stabilizer manufactured according to the invention can enjoy a desired durability and obviate the necessity of heat treatment including quenching and tempering. Thus, the necessary manufacturing equipment and energy for the heat treatment can be saved, so that the manufacturing cost can be lowered.

The manufacturing method of the invention may further comprise an annealing process for subjecting the thick-walled pipe to stress relieving annealing at a temperature of 300° C. to 450° C., after the bending process, and a shot peening process for cooling the thick-walled pipe to room temperature and then shot-peening the same, after the annealing process. Alternatively, the method of the invention may further comprise an annealing process for subjecting the thick-walled pipe to stress relieving annealing at a temperature of 300° C. to 450° C., after the bending process, and a shot peening process for shot-peening the thick-walled pipe while the pipe is kept at a temperature of 300° C. to 400° C., after the annealing process. By carrying out the annealing process and the shot peening process, as well as by the aforementioned effect of the invention, the durability of the hollow stabilizer can be improved.

Alternatively, furthermore, the manufacturing method of the invention may further comprise an internal shot peening process for shot-peening the inner surface of the thick-walled pipe before carrying out the bending process. This internal shot peening process can further improve the durability of the hollow stabilizer of the invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings of FIGS. 1 to 5.

Figure 2:
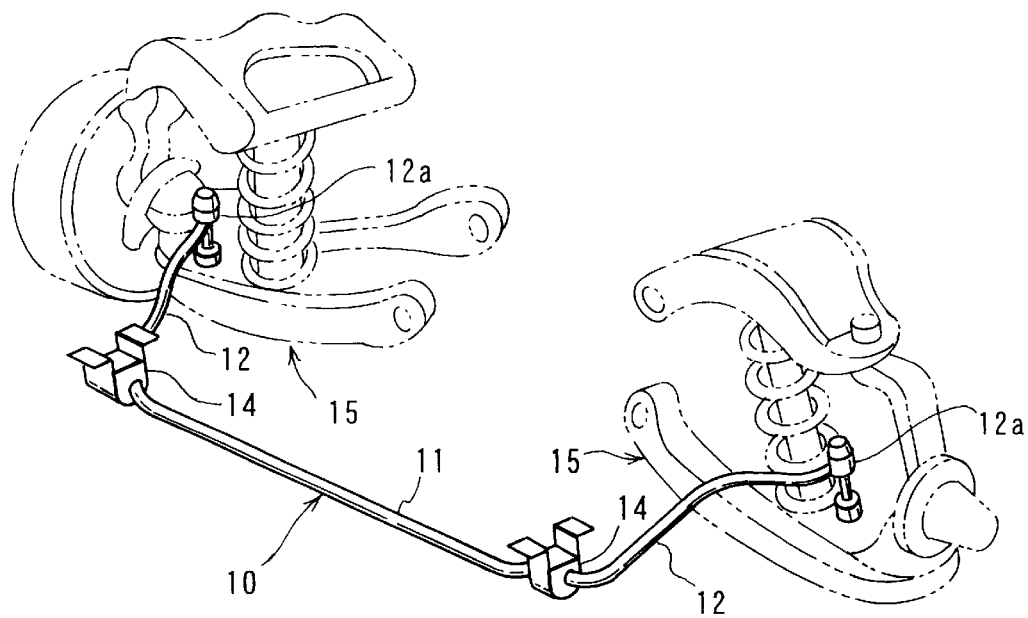
FIG. 2 is a partial perspective view of a suspension mechanism with the hollow stabilizer according to the embodiment of the invention.

A hollow stabilizer 10 shown in FIG. 2 comprises a main portion 11 extending in the crosswise direction of the body of a vehicle (not shown) and a pair of arm portions 12, right and left, connected individually to the opposite ends of the main portion 11. The main portion 11 is supported on the vehicle body by means of rubber bushes 14 and the like. An end 12a of each arm portion 12 is connected to its corresponding one of suspension mechanisms 15, right and left, by means of a stabilizer link (not shown) or the like.

In order to avoid interference with a part of the vehicle body or the suspension mechanisms 15, the main portion 11 and the arm portions 12 are bent at several or more than ten points. If inputs of vertically opposite phases are applied individually to the right- and left-hand suspension mechanisms 15, as in the case where the vehicle having the stabilizer 10 changes its course or makes a turn, the right- and left-hand arm portions 12 bend in opposite directions, and the main portion 11 is twisted. Thus, the stabilizer 10 functions as a spring for restraining the vehicle body from rolling.

Figure 1:
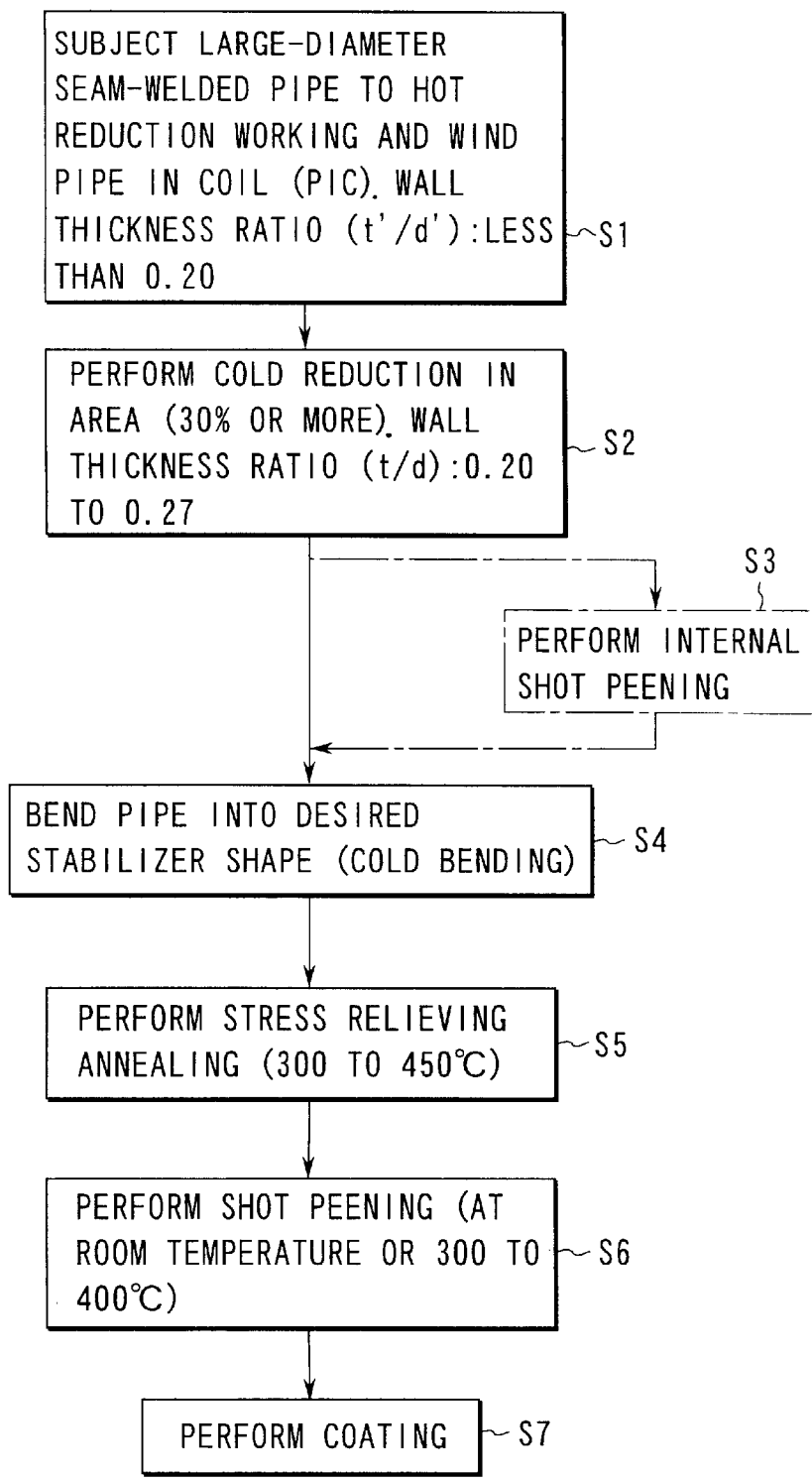
FIG. 1 is a flowchart showing manufacturing processes for a hollow stabilizer according to an embodiment of the present invention.

A manufacturing method for the hollow stabilizer according to the present invention will now be described with reference to FIG. 1 and other drawings. A seam-welded pipe used in a primary pipe manufacturing process S1 is manufactured in a manner such that a hot-rolled and hooped sheet with a carbon content of 0.45% or less is formed into a pipe with a circular cross section by the conventional roll forming method as seams along its axial direction are continuously welded by high-frequency induction.

Figure 3:
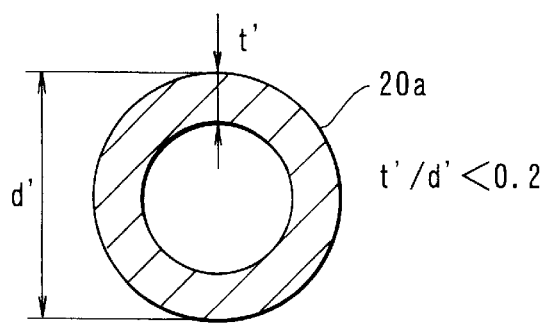
FIG. 3 is a sectional view of a primary pipe used in the hollow stabilizer of the invention.
Figure 4:
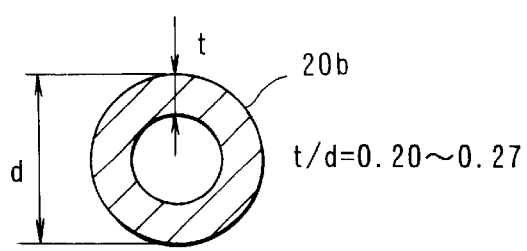
FIG. 4 is a sectional view of a thick-walled pipe obtained by subjecting a primary pipe shown in FIG. 3 to cold drawing.

First, in the primary pipe manufacturing process S1, the seam-welded pipe having a diameter larger than the outside diameter of the stabilizer is subjected to continuous hot reduction working, whereupon an elongate primary pipe 20a (cross section of which is shown in FIG. 3) that is smaller in diameter than the seam-welded pipe is obtained. The reduction working in the primary pipe manufacturing process S1 is carried out at the austenitizing temperature (e.g., 750° C. to 900° C.) of carbon steel, for example. A so-called PIC (pipe in coil) is obtained by winding the primary pipe 20a in a coil with a diameter of several meters. The wall thickness ratio (t'/d') of the primary pipe 20a is lower than 0.2. Symbols t' and d' designate the wall thickness and outside diameter of the primary pipe 20a, respectively.

Then, in a cold drawing process S2, cold drawing is carried out by using a die, floating plug, etc. so that the rate of area reduction of the primary pipe 20a is not lower than 30%. In the present specification, the cold state implies a temperature near room temperature (normal temperature, e.g., 15° C.) that involves no positive heating. However, the concept of the cold state implies a temperature rise caused by processing heat and some temperature rises that are attributable to any other factors. The rate of reduction in area is given by $[(A1-A2)/A1] \times 100$ (%), where A1 and A2 are sectional areas before and after working, respectively.

In the cold drawing process S2, a straight thick-walled pipe 20b (drawn PIC with a cross section shown in FIG. 4) with an increased wall thickness ratio (t/d) of 0.20 to 0.27 and tensile strength $\sigma_B$ of 800 to 1,000 N/mm$^2$ is obtained. Symbols t and d designate the wall thickness and outside diameter of the thick-walled pipe 20b, respectively. The tensile strength of carbon steel can be enhanced by increasing the rate of reduction in area. Thus, a desired tensile strength can be obtained by adjusting the rate of area reduction according to the type of carbon steel. Normally, the rate of area reduction for cold pipe drawing is restricted to 45% or below.

Figure 5:
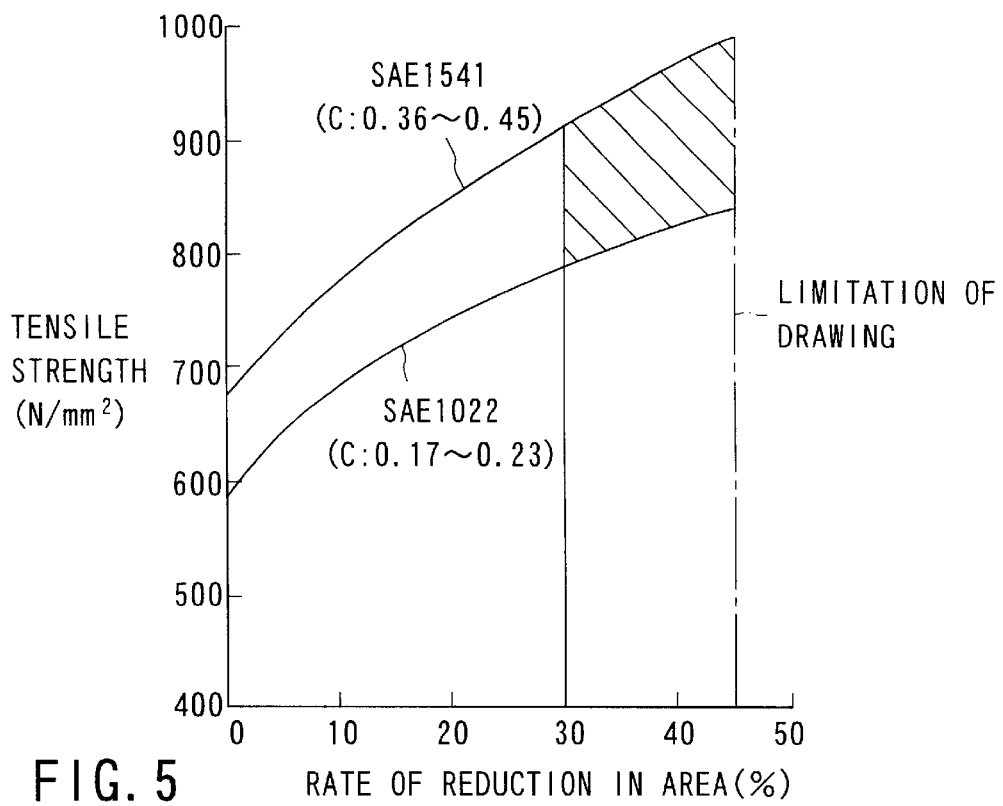
FIG. 5 is a diagram illustrating relations between the rate of reduction in area and tensile strength in a cold drawing process.
Figure 6:
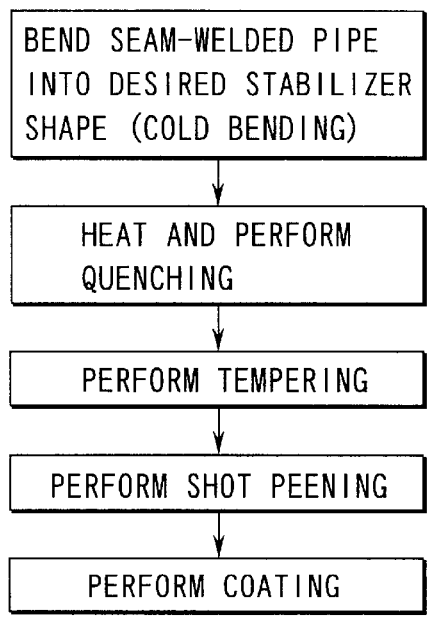
FIG. 6 is a flowchart showing manufacturing processes for a conventional hollow stabilizer.

FIG. 5 illustrates relations between the rate of reduction in area and tensile strength for the cases of steel types SAE1022 and SAE1541 provided by the Society of Automotive Engineers (SAE). Other steel types have similar tendencies. The SAE1022 consists mainly of Fe and further contains 0.17 to 0.23 wt% of C, 0.70 to 1.00 wt% of Mn, and very small quantities of Si, P, S, etc. for the remainder. The SAE1541 also consists mainly of Fe and further contains 0.36 to 0.45 wt% of C, 1.30 to 1.65 wt% of Mn, and very small quantities of Si, P, S, etc, for the remainder.

In the cold drawing process S2, the primary pipe 20a is subjected to heavy reduction processing by plastic working. By doing this, the thick-walled pipe 20b with the aforesaid tensile strength $\sigma_B$ can be obtained without carrying out quenching, tempering, or other heat treatment that is involved in manufacturing processes for conventional solid or hollow stabilizers. The thick-walled pipe (drawn PIC) 20b can be cut to stabilizers with a given length.

Before carrying out a bending process S4 after the cold drawing process S2 is finished, an internal shot peening process S3 may be performed as required, as in the case of Example 6 (mentioned later). In the internal shot peening process S3, a large number of shots, along with compressed air, are struck against the inner surface of the straight thick-walled pipe 20b by means of an air-jet shot blaster, whereby the residual compressive stress is generated in the inner surface portion of the pipe 20b. In this case, the pipe 20b to be shot-peened is straight, so that the shot blaster can be easily used without requiring a complicated construction.

In the bending process S4, the thick-walled pipe 20b is bent in a cold state by means of a bending machine or the like, whereupon the main portion 11 and the arm portions 12 and other portions are formed into a desired stabilizer shape. The end 12a of the arm portions 12 is also formed.

In an annealing process S5 that follows the bending process S4, the thick-walled pipe 20b is heated to 300° C. to 450° C. in an oven or the like. The pipe 20b is subjected to stress relieving annealing in a manner such that it is kept at this temperature for a proper period of time (e.g., scores of minutes). In this annealing process S5, the harmful residual stress that remains in the thick-walled pipe 20b after the bending process S4 is removed.

In a shot peening process S6 that follows the annealing process S5, the outer surface of the thick-walled pipe 20b is shot-peened. This shot peening process S6 is carried out with the temperature of the pipe 20b lowered to room temperature, as in the cases of Examples 1, 3 and 5, which will be mentioned later. Alternatively, the process S6 may be performed while the thick-walled pipe 20b is kept at the temperature of 300° C. to 400°C. immediately after the end of the annealing process S5, as in the cases of Examples 2, 4 and 6.

Finally, in a coating process S7, the outer surface of the hollow stabilizer 10 is subjected to rust preventing coating, and if necessary, the inner surface of the stabilizer 10 is subjected to corrosion proofing. Each of articles having passed given examinations is completed as the hollow stabilizer 10.

TABLE 1 below shows the results of comparison in the design stress, rate of reduction in weight, etc. between Design Examples 1 to 3 of hollow stabilizers that are designed according to the technical concept of the present invention, Prior Art Example 1 (solid round rod), and Prior Art Example 2 (seam-welded pipe).

TABLE 1

| | Type of material | Size of material | Design stress (N/mm$^2$) | Increasing rate of stress on solid stabilizer | Rate of reduction in weight |
|---|---|---|---|---|---|
| Prior Art | Solid round rod | φ15 | 450 | — | — |
| Example 1 | | | | | |
| Prior Art | Seam-welded pipe | φ15.9 (t2.6) | 522 | 1.16 | 38% |
| Example 2 | | | | | |
| Invention (Design Example 1) | Drawn PIC | φ15.5 (t3.2) | 477 | 1.06 | 30% |
| Invention (Design Example 2) | Drawn PIC | φ15.3 (t3.6) | 456 | 1.022 | 25% |
| Invention (Design Example 3) | Drawn PIC | φ15.2 (t4.0) | 455 | 1.012 | 20% |

As shown in TABLE 1, Prior Art Example 2 (seam-welded pipe) displays the highest rate of reduction in weight. According to Prior Art Example 2, however, the increasing rate of stress (on a solid stabilizer) is so much higher than that of Prior Art Example 1 that the durability may possibly lower depending on the using conditions. According to any of Design Examples 1 to 3 using the aforesaid thick-walled pipe, the rate of reduction in weight ranges from 30% to 20%, which is lower than that of Prior Art Example 2, although the increasing rate of stress is restricted to a low level. Thus, the design stress on each of the hollow stabilizers of Design Examples 1 to 3 is equal to that on the solid round rod of Prior Art Example 1.

Based on the design examples of TABLE 1, Examples 1 to 4 shown in TABLE 2 were prepared by way of trial, in order to hollow a conventional solid stabilizer with an outside diameter of 15 mm. For each of these examples, three samples were checked for durability (fatigue strength). TABLE 2 shows the results of this check test for comparison. Prior Art Examples 1 and 2 and Examples 1 to 4 shown in TABLE 2 are supposed to have a common stabilizer shape and the same spring constant (stiffness) and enjoy durability of 150,000 cycles or more with the same flexure (displacement).

TABLE 2

| | Type of material (tensile strength) | Size of material (rate of reduction in weight) | Size of PIC (rate of reduction in area) | Design stress (N/mm$^2$) | Durability | Remarks |
|---|---|---|---|---|---|---|
| Prior Art Example 1 | SUP9: Solid round rod (1270N/mm$^2$) | φ15 (–) | — | 450 | 758, 600 696, 400 653, 800 | |
| Prior Art Example 2 | Seam-welded pipe (1220N/mm$^2$) | φ15.9, t2.6 (t/d:0.16) (38%) | — | 522 | 189, 300 265, 200 289, 800 | |
| Example 1 | SAE1541: Drawn PIC (950N/mm$^2$) | φ15.5, t3.2 (t/d:0.207) (30%) | φ21.7 t3.7 (41%) | 477 | 618, 900 563, 700 471, 500 | Shot peening at room temperature after annealing |
| Example 2 | SAE1541: Drawn PIC (950N/mm$^2$) | φ15.5, t3.2 (t/d:0.207) (30%) | φ21.7 t3.7 (41%) | 477 | 729, 600 678, 400 628, 500 | Shot peening immediately after annealing |

TABLE 2-continued

|  | Type of material (tensile strength) | Size of material (rate of reduction in weight) | Size of PIC (rate of reduction in area) | Design stress (N/mm$^2$) | Durability | Remarks |
|---|---|---|---|---|---|---|
| Example 3 | SAE1022: Drawn PIC (830N/mm$^2$) | φ15.2, t4.0 (t/d:0.26) (20%) | φ21.7 t4.6 (43%) | 456 | 193, 600 238, 900 328, 400 | Shot peening at room temperature after annealing |
| Example 4 | SAE1022: Drawn PIC (830N/mm$^2$) | φ15.2, t3.2 (t/d:0.21) (20%) | φ21.7 t4.6 (43%) | 456 | 334, 700 298, 100 228, 400 | Shot peening immediately after annealing |

According to Examples 1 and 3 shown in TABLE 2, hollow stabilizers were manufactured by effecting the aforementioned manufacturing processes (FIG. 1), including the primary pipe manufacturing process S1, cold drawing process S2, bending process S4, annealing process S5, and shot peening process S6 carried out at room temperature. According to Examples 2 and 4, hollow stabilizers were manufactured by effecting the primary pipe manufacturing process S1, cold drawing process S2, bending process S4, annealing process S5, and shot peening process S6 carried out at 300° C. to 400° C. immediately after annealing.

Prior Art Example 1 shown in TABLE 2 is a solid stabilizer that is thermally refined so as to have a strength of 1,270 N/mm$^2$ by quenching and tempering a solid round rod. Although Prior Art Example 1 is heavy in weight, it has satisfactory durability. Prior Art Example 2 is a hollow stabilizer that is thermally refined so as to have a strength of 1,220 N/mm$^2$ by quenching and tempering a seam-welded pipe with a wall thickness ratio of 0.16. Although Prior Art Example 2 can attain a rate of weight reduction of 38%, its durability is only about ¼ to ⅓ of that of the solid stabilizer (Prior Art Example 1).

In Examples 1 to 4 according to the present invention, in contrast with this, the primary pipe 20a is subjected to the cold drawing process S2, whereby the thick-walled pipe 20b (drawn PIC) can be given a strength of 950 N/mm$^2$ or 830 N/mm$^2$ without being quenched or tempered. According to these examples, the increase of the design stress can be minimized, and the durability is much higher than that of Prior Art Example 2.

According to Prior Art Example 2, in particular, the shot peening is carried out at a temperature of 300° C. to 400° C. immediately after the annealing process S5, whereby the durability of the same level as that of the solid stabilizer of Prior Art Example 1 is obtained. Based on this shot peening at the temperature of 300° C. to 400° C., the strength of the surface of the thick-walled pipe 20b is enhanced by work hardening and strain aging. Thus, the strength of the surface of the pipe 20b is about 50 to 100 N/mm$^2$ higher than before the shot peening, so that the durability is stabilized.

TABLE 3 shows the results of a check test for the durability (fatigue strength) of Examples 5 and 6 according to the present invention, for the case where a conventional solid stabilizer (outside diameter: 27 mm) is hollowed. Prior Art Example 3 shown in TABLE 3 is a solid stabilizer that is thermally refined so as to have a strength of 1,270 N/mm$^2$ by heat treatment such as quenching and tempering a solid round rod.

TABLE 3

|  | Type of material (tensile strength) | Size of material (rate of reduction in weight) | Design stress (N/mm$^2$) | Durability | Remarks |
|---|---|---|---|---|---|
| Prior Art Example 3 | SUP9: Solid round rod (1270N/mm$^2$) | φ27 (–) | 420 | >1,000,000 996, 400 873, 800 |  |
| Example 5 | SAE1541: Drawn PIC (950N/mm$^2$) | φ27.9, t5.8 (t/d:0.208) (30%) | 445 | 469, 300 665, 200 389, 800 | Shot peening at room tempera- after annealing |
| Example 6 | SAE1541: Drawn PIC (950N/mm$^2$) | φ27.9, t5.8 (t/d:0.208) (30%) | 445 | 868, 900 963, 700 971, 500 | Internal shot peening and shot peening immediatley after annealing |

A hollow stabilizer of Example 5 shown in TABLE 3 was manufactured by effecting the primary pipe manufacturing process S1, cold drawing process S2, bending process S4, annealing process S5, and shot peening process S6 carried out at room temperature. In Example 5, the cold drawing process S2 is carried out to give a strength of 950 N/mm$^2$ to the thick-walled pipe 20b without quenching or tempering it. According to this example, the increase of the design stress can be made less than that of the solid stabilizer of Prior Art Example 3, and the durability is much higher than 1,50,000 cycles, a target value.

A hollow stabilizer of Example 6 was manufactured by effecting the primary pipe manufacturing process S1, cold drawing process S2, internal shot peening process S3, bending process S4, annealing process S5, and shot peening process S6 carried out at 300° C. to 400° C. immediately after annealing. According to Example 6, the durability of the same level as that of the solid stabilizer of Prior Art Example 3 is obtained by carrying out the internal shot peening process S3 and the shot peening process S6 at 300° C. to 400° C. immediately after annealing.

If the pipe (wall thickness ratio: less than 0.2) used has a rate of weight reduction higher than 35%, its design stress is so high that the pipe may be broken before repetition of 150,000 cycles, in some cases. It is ascertained that the pipe can be broken before repetition of 150,000 cycles if its tensile strength is less than 750 N/mm². The durability of 150,000 cycles or more can be obtained, as shown in TABLE 2, if the thick-walled pipe 20b is worked in the cold drawing process S2 so that its wall thickness ratio ranges from 0.2 to 0.27 (rate of weight reduction: 20 to 30%). According to the existing pipe drawing technique using a die or the like, it is hard to work the pipe so that the wall thickness ratio exceeds 0.27. If the wall thickness ratio exceeds 0.27, moreover, there is no advantage of reduction in weight.

The tensile strength is greatly influenced by the carbon content of the material. In the case of the SAE1022 shown in FIG. 5, for example, a rate of area reduction of 30% or more is needed to secure a tensile strength of 800 N/mm². In the case where a carbon-rich material (e.g., SAE1541) is used to enhance the tensile strength, moreover, a tensile strength of 1,000 N/mm² can be secured by drawing the pipe with a rate of reduction in area of 45%. Due to restrictions on the drawing operation, however, it is hard to manufacture pipes with higher tensile strengths. Furthermore, materials with carbon contents higher than that (0.45 wt%) of the SAE1541 are not suitable for the purpose because the quality of welds for the manufacture of the seam-welded pipe is unstable.

From these reasons, according to the present invention, the wall thickness ratio t/d and tensile strength of the thick-walled pipe 20b to be subjected to reduction working by cold drawing process S2 are restricted to 0.20 to 0.27 and 800 to 1,000 N/mm², respectively. It is to be desired, moreover, that the carbon content of the seam-welded pipe used in the invention should range from 0.17 to 0.45 wt%.

If the temperature used in the annealing process S5 is lower than 300° C., the harmful residual stress attributable to the plastic working in the bending process S4 cannot be removed satisfactorily. At a temperature higher than 450° C., however, the thick-walled pipe 20b starts to soften inevitably. Thus, it is advisable to adjust the annealing temperature within the range from 300° C. to 450° C.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manufacturing method for making a hollow stabilizer, comprising:

a primary pipe manufacturing process for subjecting a seam-welded pipe to continuous hot reduction working, thereby obtaining a primary pipe, and winding the primary pipe in a coil;

a cold drawing process for subjecting the primary pipe to cold drawing so that a rate of reduction in area is not lower than 30%, thereby obtaining a thick-walled pipe having a wall thickness ratio of 0.20 to 0.27 and a tensile strength of 800 N/mm² to 1,000 N/mm², said wall thickness ratio of 0.20 to 0.27 being higher than a wall thickness ratio of the seam-welded pipe;

a bending process for bending the thick-walled pipe, obtained in the cold drawing process, into a desired stabilizer shape in a cold state;

an annealing process for subjecting the thick-walled pipe to stress relieving annealing at a temperature of 300° C. to 450° C., after the bending process; and a shot peening process for shot-peening the thick-walled pipe while the pipe is kept at a temperature of 300° C. to 400° C., after the annealing process.

2. A manufacturing method for making a hollow stabilizer according to claim 1, further comprising an internal shot peening process for shot-peening an inner surface of the thick-walled pipe before carrying out the bending process, after the cold drawing process.

* * * * *